United States Patent
Karuppannan et al.

(10) Patent No.: US 11,997,170 B2
(45) Date of Patent: May 28, 2024

(54) AUTOMATED MIGRATION OF MONOLITHIC APPLICATIONS TO CONTAINER PLATFORMS

(71) Applicant: VMWARE, INC., Palo Alto, CA (US)

(72) Inventors: Tamil Vanan Karuppannan, Karur (IN); Prasanna Kumar Subramanyam, Hyderabad (IN)

(73) Assignee: VMware LLC, Palo Alto, CA (US)

( * ) Notice: Subject to any disclaimer, the term of this patent is extended or adjusted under 35 U.S.C. 154(b) by 6 days.

(21) Appl. No.: 17/465,887

(22) Filed: Sep. 3, 2021

(65) Prior Publication Data

US 2023/0021723 A1 Jan. 26, 2023

(30) Foreign Application Priority Data

Jul. 21, 2021 (IN) .............................. 202141032804

(51) Int. Cl.
*H04L 67/148* (2022.01)
*G06F 9/455* (2018.01)
*H04L 9/40* (2022.01)
*H04L 67/06* (2022.01)

(52) U.S. Cl.
CPC ........ *H04L 67/148* (2013.01); *G06F 9/45558* (2013.01); *H04L 63/0263* (2013.01); *H04L 67/06* (2013.01); *G06F 2009/45595* (2013.01)

(58) Field of Classification Search
CPC ... H04L 63/0263; H04L 67/148; H04L 67/06; G06F 9/45558
See application file for complete search history.

(56) References Cited

U.S. PATENT DOCUMENTS

| | | | | |
|---|---|---|---|---|
| 9,986,031 | B2 * | 5/2018 | Jain | H04L 67/1095 |
| 10,498,845 | B1 * | 12/2019 | Kapoor | H04L 67/306 |
| 10,740,362 | B2 * | 8/2020 | Agrawal | G06F 16/285 |
| 10,892,960 | B1 * | 1/2021 | Emelyanov | H04L 67/34 |
| 10,986,196 | B1 * | 4/2021 | Kapoor | G06F 9/545 |
| 11,163,614 | B1 * | 11/2021 | Francisco | G06F 9/5088 |
| 11,175,939 | B2 * | 11/2021 | Kumatagi | G06F 9/45558 |
| 11,188,661 | B2 * | 11/2021 | Peng | H04L 63/105 |
| 11,201,955 | B1 * | 12/2021 | Sachdeva | H04L 41/40 |

(Continued)

FOREIGN PATENT DOCUMENTS

CN 111414229 * 3/2020 ......... G06F 9/45558

OTHER PUBLICATIONS

Horii et al., "Stateful process migration for edge computing applications", IEEE Wireless Communications and Networking Conference, Apr. 15, 2019.*

(Continued)

*Primary Examiner* — Todd L Barker
(74) *Attorney, Agent, or Firm* — Kim & Stewart LLP

(57) ABSTRACT

A method of migrating an application to a container platform includes the steps of: installing a first agent that collects information about the application; detecting information about a first process of the application, wherein the detected information about the first process is received from the first agent; and based on the detected information about the first process, generating a container file including instructions for building a first container that executes the first process and a deployment file for deploying the first container for execution on the container platform.

15 Claims, 11 Drawing Sheets

(56) References Cited

U.S. PATENT DOCUMENTS

| | | | | |
|---|---|---|---|---|
| 11,281,492 | B1* | 3/2022 | Rebeja | G06F 9/5077 |
| 11,470,172 | B1* | 10/2022 | Kapoor | G06F 21/57 |
| 11,487,878 | B1* | 11/2022 | Zhang | G06F 9/5077 |
| 11,770,464 | B1* | 9/2023 | Sachdeva | G06F 9/45558 |
| | | | | 709/224 |
| 2016/0274928 | A1* | 9/2016 | Linton | G06F 9/45558 |
| 2017/0163575 | A1* | 6/2017 | Wang | H04L 49/9094 |
| 2017/0270449 | A1* | 9/2017 | Shrimali | G06F 8/00 |
| 2017/0359414 | A1* | 12/2017 | Sengupta | G06F 9/45558 |
| 2018/0053001 | A1* | 2/2018 | Folco | G06F 21/53 |
| 2018/0357086 | A1* | 12/2018 | Kinsella | G06F 9/45558 |
| 2019/0014154 | A1* | 1/2019 | Vaidya | G06F 21/53 |
| 2019/0324786 | A1* | 10/2019 | Ranjan | G06F 9/4555 |
| 2019/0386956 | A1* | 12/2019 | Lan | H04L 63/10 |
| 2020/0293354 | A1* | 9/2020 | Song | G06F 11/1438 |
| 2021/0026707 | A1* | 1/2021 | Rosenberg | G06F 9/485 |
| 2021/0165887 | A1* | 6/2021 | Morello | G06F 9/45558 |
| 2021/0266224 | A1* | 8/2021 | Lifshitz | H04L 41/0886 |
| 2022/0164223 | A1* | 5/2022 | Llamas Virgen | G06F 9/5088 |
| 2023/0115707 | A1* | 4/2023 | Khan | G06F 9/45558 |
| | | | | 718/1 |

OTHER PUBLICATIONS

Matsubara et al., "Adaptive OS Switching for Improving Availability During Web Traffic Surges: A Feasibility Study" IEEE 44th Annual Computers Software, and Applications Conference, Jul. 13, 2020.* ip.com_npl, "A total solution for mgirating a virtual machine to docker", Apr. 18, 2016.*

Zhang et al., "Dynamic Adaptive Network Edge Service Migration Method Based on a Docker Container", 2019 IEEE 5th International Conference on Computer and Communications (ICC), Dec. 6, 2019.*

Indrasiri et al., "Microservices for teh Enterprise", pp. 219, 262, Nov. 2018.*

Shmeleva, How Microservices are Changing the Security Landscape, 2020.*

Newman, "Monotith to Microservices", O'Reily Media, 2020.*

Ranganathan, "A highly-available and scalable microservice architecture for access managment" Sep. 17, 2018.*

Zeng et al., "A Novel Construction Technologyh of Enterprise Business Deployment Architecture Based on Containerized Microservice", International Conference on Communication, Image and Signal Processing, Nov. 13, 2020.*

* cited by examiner

Application-Specific Factors

Process-Specific Factors

Example information about a guest OS:
DISTRIB_ID=Ubuntu
DISTRIB_RELEASE=20.04
DISTRIB_CODENAME=focal
DISTRIB_DESCRIPTION="Ubuntu 20.04.2 LTS"
NAME="Ubuntu"
VERSION="20.04.2 LTS (Focal Fossa)"

⎫ 330

Example running processes of a monolithic app:
| UID | PID | PPID | C | STIME | TTY | TIME | CMD |
|---|---|---|---|---|---|---|---|
| root | 1473 | 1 | 0 | Jun30 | ? | 00:00:00 | se_dp: master process /opt/avi/bin/se_dp --log_dir=/var/lib/avi/log/glog |
| root | 1533 | 1473 | 13 | Jun30 | ? | 02:46:19 | se_dp: worker process 0: |
| root | 1534 | 1473 | 13 | Jun30 | ? | 02:40:18 | se_dp: worker process 1: |
| root | 1608 | 1 | 0 | Jun30 | ? | 00:08:12 | /opt/avi/bin/se_agent --log_dir=/var/lib/avi/log/glog --metrics_timer=60000 --rt_metrics_timer=100 |

⎫ 332

Example outbound socket connections and listening ports for a process:
| Proto | Recv-Q | Send-Q | Local Address | Foreign Address | State | User | Inode | PID/Program name |
|---|---|---|---|---|---|---|---|---|
| tcp | 0 | 0 | 127.0.0.1:63086 | 127.0.0.9:5034 | ESTABLISHED | 0 | 32093 | 1608/se_agent |
| tcp | 0 | 0 | 127.0.0.1:63691 | 127.0.0.1:3998 | ESTABLISHED | 0 | 30198 | 1608/se_agent |
| tcp6 | 0 | 0 | 127.0.0.1:9003 | :::* | LISTEN | 0 | 28675 | 1608/se_agent |

⎫ 334

Example environment variables for a process:
['INSTALL_BIN_PATH': '/opt/avi/bin',   'PWD': '/',
'AVI_METRICS_TIMER': '60000',   'PATH': '/usr/local/sbin:/usr/local/bin:/usr/sbin:/usr/bin:/sbin:/bin',   'LANG': 'en_US.UTF-8',
                                                                                                         'LOG_DIR': '/var/lib/avi/log/glog']

⎫ 336

Example command used for starting a process:
['/opt/avi/bin/se_agent','--log_dir=/var/lib/avi/log/glog','--metrics_timer=60000','--rt_metrics_timer=100']

⎫ 338

Example shared library dependencies for a process:
/opt/avi/lib/libmlx5.so.1
/opt/avi/lib/libibverbs.so.1
/opt/avi/lib/librte_pmd_mlx5_glue.so.20.02.0

⎫ 340

Example IPCs of processes:
0x12345678: /opt/avi/bin/se_agent /opt/avi/bin/se_dp
0x1234567a: /opt/avi/bin/se_agent /opt/avi/bin/se_dp
/opt/avi/bin/se_agent [2]: 0x12345678 0x1234567a
/opt/avi/bin/se_dp [2]: 0x12345678 0x1234567a

```
# Example auto-generated Dockerfile

# Base OS image
FROM ubuntu:20.04

# Maintainer
LABEL maintainer=vShift@test.com

# Environment variables
ENV INSTALL_BIN_PATH: /opt/avi/bin \
PWD: / \
LANG: en_US.UTF-8 \
AVI_METRICS_TIMER: 60000 \
PATH: /usr/local/sbin:/usr/local/bin:/usr/sbin:/usr/bin:/sbin:/bin \
LOG_DIR: /var/lib/avi/log/glog

# Shared library
COPY ~/vshift/se_agent/lib /

# Expose listening port and create entrypoint
COPY entrypoint.sh /sbin/entrypoint.sh RUN chmod 755 /sbin/entrypoint.sh EXPOSE 9003/tcp
ENTRYPOINT ["/sbin/entrypoint.sh"]
```

```
# Example auto-generated entrypoint.sh

#!/bin/bash

# Start "se_agent" process
/opt/avi/bin/se_agent --log_dir=/var/lib/avi/log/glog --metrics_timer=60000 --rt_metrics_timer=1000

#Start "se_dp" process
/opt/avi/bin/se_dp --log_dir=/var/lib/avi/log/glog
```

Figure 5C

```
630   # Example auto-generated Kubernetes deployment file apiVersion: apps/v1
      kind: Deployment
      metadata:
        name: se-agent-se-dp-deployment
        labels:
          app: se-agent-se-dp
      spec:
        replicas: 1
        selector:
          matchLabels:
            app: se-agent-se-dp
        template:
          metadata:
            labels:
              app: se-agent-se-dp
          spec:
            containers:
            - name: se-agent-se-dp-container
              image: se-agent-se-dp-image
              ports:
              - containerPort: 9003
```

Figure 6B

```
640   # Example auto-generated Kubernetes service file apiVersion: v1
      kind: Service
      metadata:
        name: se-agent-se-dp-service
      spec:
        type: LoadBalancer
        selector:
          app: se-agent-se-dp
        ports:
        - protocol: TCP
          port: 9003
          targetPort: 9003
```

Figure 6C

```
Example auto-generated iptables rules iptables -t nat -A OUTPUT -o lo -p tcp -m tcp --dport 9003 -j DNAT --to-destination se-agent-se-dp-service.vshift.svc.k8s.com:9003
iptables -t nat -A POSTROUTING -o ens192 -m addrtype --src-type LOCAL --dst-type UNICAST -j MASQUERADE
```

Figure 6D

AUTOMATED MIGRATION OF MONOLITHIC APPLICATIONS TO CONTAINER PLATFORMS

RELATED APPLICATION

Benefit is claimed under 35 U.S.C. 119(a)-(d) to Foreign Application Serial No. 202141032804 filed in India entitled "AUTOMATED MIGRATION OF MONOLITHIC APPLICATIONS TO CONTAINER PLATFORMS", on Jul. 21, 2021, by VMware, Inc., which is herein incorporated in its entirety by reference for all purposes.

BACKGROUND

Organizations today increasingly develop applications as groups of microservices that may be deployed on cloud-native container platforms. This application development approach has several advantages over developing applications as monoliths. For example, if an application is developed as a group of separate microservices, those microservices may be individually scaled up and down as needed. Additionally, developers can more easily manage and update microservices than they can manage and update portions of large, monolithic applications. As such, this development approach allows developers to deploy and upgrade applications quickly and effectively.

However, many organizations have already developed monolithic applications that would be prohibitively costly to redevelop. Such organizations thus require a convenient solution for migrating their legacy applications to cloud-native platforms without significant downtime. Furthermore, such migrations could be complicated and risky. For example, once a monolithic application is split into separate microservices and migrated, some of the microservices may not function properly. As such, the solution should provide a mechanism that protects organizations from unsuccessful migrations.

SUMMARY

Accordingly, one or more embodiments provide a method of migrating an application to a container platform. The method includes the steps of: installing a first agent that collects information about the application; detecting information about a first process of the application, wherein the detected information about the first process is received from the first agent; and based on the detected information about the first process, generating a container file including instructions for building a first container that executes the first process and a deployment file for deploying the first container for execution on the container platform.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 3B is an example of information about a monolithic application, according to an embodiment.

FIG. 5B is an example of an automatically generated Dockerfile for building a container to execute processes of a microservice, according to an embodiment.

FIG. 5C is an example of an automatically generated entrypoint file for starting migrated processes of a microservice, according to an embodiment.

FIG. 6B is an example of an automatically generated deployment file, according to an embodiment.

FIG. 6C is an example of an automatically generated service file, according to an embodiment.

FIG. 6D is an example of automatically generated firewall rules, according to an embodiment.

DETAILED DESCRIPTION

Techniques for automatically migrating legacy applications to a container platform are described. The techniques involve installing agents in virtual machines (VMs) running monolithic applications. The agents collect information about processes running therein, such information being useful for determining which processes to group together and migrate as microservices. The collected information is also useful for automatically performing such migrations. For each process (or group of processes) that is migrated as a microservice, instructions are generated for building a container that executes the process(es). Each container is deployed on a container platform to execute as a microservice.

The techniques described herein provide a seamless method for splitting monolithic applications into microservices and deploying those microservices as containers. Such migration does not require redevelopment of applications or any input from an administrator of an application. Such migration also does not result in any downtime for an application and may be reversed if any issues arise on the container platform. These and further aspects of the invention are discussed below with respect to the drawings.

Figure 1:
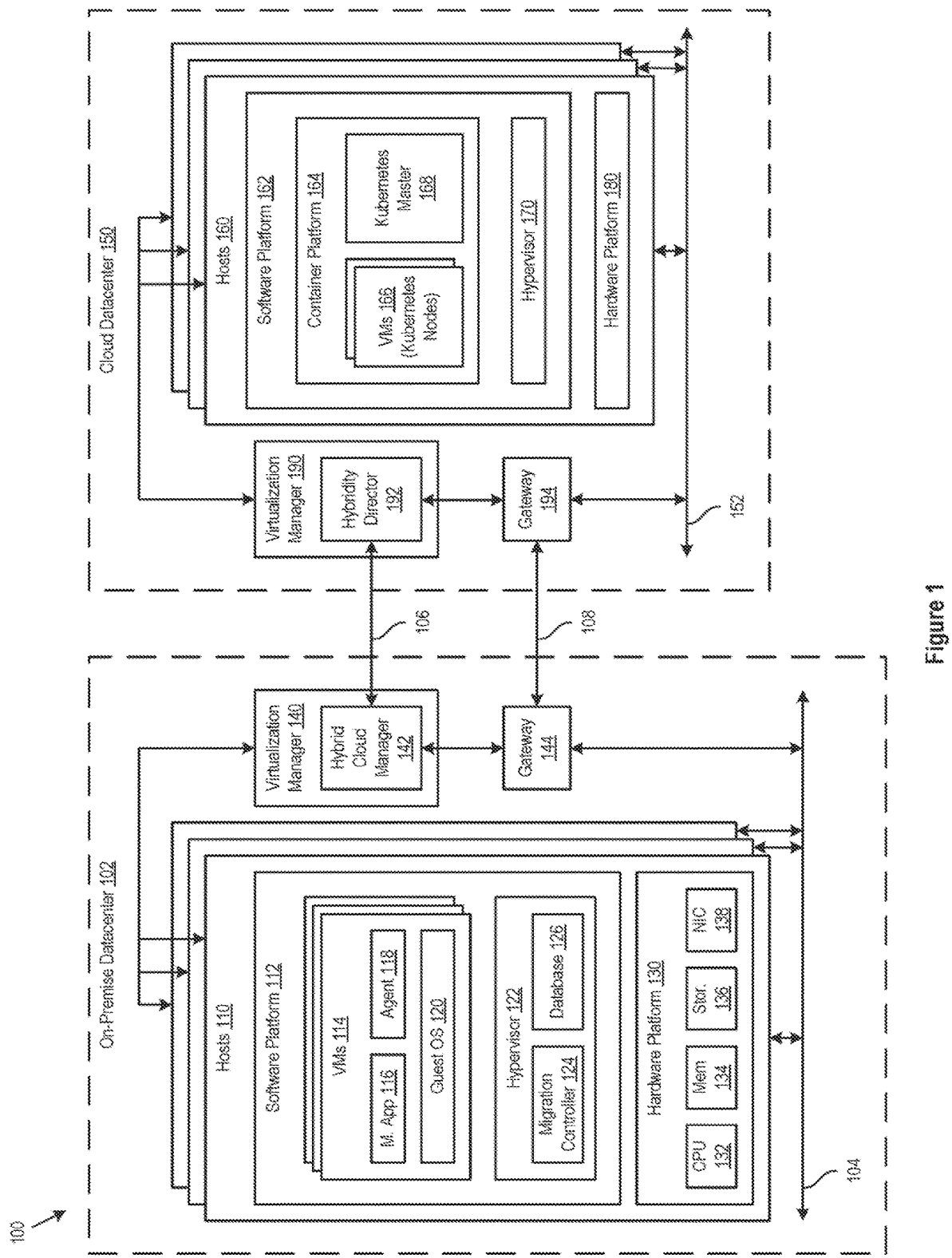
FIG. 1 is a block diagram of a hybrid cloud computing system in which embodiments may be implemented.

FIG. 1 is a block diagram of a hybrid cloud computing system 100 in which embodiments may be implemented. Hybrid cloud computing system 100 includes an on-premise datacenter 102 and a cloud datacenter 150 and provides a common platform for managing and executing virtual workloads seamlessly between the datacenters. On-premise datacenter 102 may be controlled and administrated by a particular enterprise or business organization. Cloud datacenter 150 may be operated by a cloud computing service provider to expose a "public" cloud service to various account holders. In other embodiments, the particular enterprise or business controlling on-premise datacenter 102 may control cloud datacenter 150 as a "private" cloud service.

On-premise datacenter 102 includes a cluster of hosts 110 that may be constructed on server grade hardware platforms 130 such as x86 architecture platforms. Each hardware platform 130 includes conventional components of a computing device, such as one or more central processing units (CPUs) 132, system memory 134 such as random-access memory (RAM), optional local storage 136 such as one or more hard disk drives (HDDs) or solid-state drives (SSDs), and one or more network interface cards (NICs) 138. CPU(s) 132 are configured to execute instructions such as executable instructions that perform one or more operations described herein, which may be stored in system memory 134. Local storage 136 of hosts 110 may also optionally be aggregated and provisioned as a virtual storage area network (vSAN). NICs 138 enable hosts 110 to communicate with each other and with other devices over a physical network 104.

Each host 110 includes a software platform 112 on which a hypervisor 122, which is a virtualization software layer, abstracts hardware resources of a hardware platform 130 for concurrently running VMs 114. One example of a hypervisor 122 that may be used is a VMware ESXi™ hypervisor by VMware, Inc. Each hypervisor 122 includes a migration controller 124 and a database 126, which are used for performing a migration of a monolithic application 116 to a container platform 164, as discussed further below.

As depicted, each VM 114 includes a plurality of processes of a monolithic application 116 running therein. The processes of a monolithic application 116 may execute within a single VM 114 or may be distributed across multiple VMs 114. On each such VM 114, monolithic application 116 is supported by a guest operating system (OS) 120 such as a Linux® distribution. Furthermore, in each VM 114, migration controller 124 installs a migration agent 118 that monitors a monolithic application 116 and guest OS 120, as discussed further below. Although the disclosure is described with reference to VMs, the teachings herein also apply to non-virtualized applications and to other types of virtual computing instances such as data compute nodes, isolated user space instances, and the like that may be migrated to a container platform as a group of microservices.

Virtualization manager 140 communicates with hosts 110 via a management network (not shown). Virtualization manager 140 performs administrative tasks such as managing hosts 110, provisioning and managing VMs 114, migrating VMs 114 from one host 110 to another, and load balancing between hosts 110. Virtualization manager 140 may be a computer program that resides and executes in a central server or, in other embodiments, a VM 114 executing in one of hosts 110. One example of a virtualization manager is the VMware vCenter Server® by VMware, Inc.

Virtualization manager 140 includes a hybrid cloud manager 142 configured to manage and integrate virtual computing resources provided by cloud datacenter 150 with those of on-premise datacenter 102. Such integration forms a unified "hybrid" computing platform. Hybrid cloud manager 142 performs "cross-cloud" administrative tasks such as deploying VMs 166 in cloud datacenter 150, transferring VMs 114 from on-premise datacenter 102 to cloud datacenter 150, and performing other "cross-cloud" administrative tasks. Hybrid cloud manager 142 may be a module or plug-in to virtualization manager 140 or a separate computer program executing in a central server or in a VM 114 in one of hosts 110.

Hybrid cloud manager 142 controls network traffic into physical network 104 via a gateway 144. Gateway 144 may be a computer program executing in a central server or in a VM 114 in one of hosts 110. Gateway 144 provides VMs 114 and other devices in on-premise datacenter 102 with connectivity to an external network 108, e.g., the Internet. Gateway 144 manages public internet protocol (IP) addresses for VMs 114 and routes traffic incoming to and outgoing from on-premise datacenter 102. Gateway 144 may also provide networking services such as firewalls, network address translation (NAT), dynamic host configuration protocol (DHCP), load balancing, and virtual private network (VPN) connectivity over external network 108.

Cloud datacenter 150 includes hosts 160 that may be constructed on server grade hardware platforms 180 such as x86 architecture platforms. Like hardware platforms 130, each hardware platform 180 includes conventional components of a computing device, such as one or more CPUs, system memory, optional local storage, and one or more NICs. The CPU(s) of hosts 160 are configured to execute instructions such as executable instructions that perform one or more operations described herein, which may be stored in system memory. The local storage of hosts 160 may optionally be aggregated and provisioned as a vSAN, and the NICs of hosts 160 enable hosts 160 to communicate with each other and with other devices over a physical network 152.

Like hosts 110, each host 160 includes a software platform 162 on which a hypervisor 170 abstracts hardware resources of a hardware platform 180 for concurrently running VMs 166. In the embodiments, container platform 164 to which monolithic application 116 is migrated is a Kubernetes® container platform. VMs 166 are nodes of container platform 164 in which containers are deployed in pods (not shown). Orchestration of containers that execute the processes of a monolithic application 116 is managed by Kubernetes master 168. Alternatively, each node 166 of container platform 164 may be a host in which pods are deployed as pod VMs. This alternative implementation is described in U.S. patent application Ser. No. 16/838,690, filed Apr. 2, 2020, the entire contents of which are incorporated herein by reference. Although a Kubernetes container platform is described as the container platform 164 to which a monolithic application 116 is migrated, other container platforms may be used as the destination for the migration.

Virtualization manager 190 communicates with hosts 160 via a management network (not shown). Virtualization manager 190 includes a hybridity director 192 that communicates with hybrid cloud manager 142 via a VPN tunnel over external network 108 or via a direct connect 106. Hybridity director 192 may be a module or plug-in to virtualization manager 190 or a separate computer program executing in a central server or in a VM 166 in one of hosts 160. Hybridity director 192 controls network traffic into physical network 152 via a gateway 194. Gateway 194 may be a computer program executing in a central server or in a VM 166 in one of hosts 160. Gateway 194 provides VMs 166 and other devices in cloud datacenter 150 with connectivity to external network 108. Gateway 194 may also provide networking services such as VPN connectivity over external network 108.

In the embodiments described herein, a migration controller 124 manages the migration of processes of a monolithic application 116 to container platform 164. To automatically migrate the processes, migration controller 124 installs a migration agent 118 in each VM 114. Agent 118 monitors monolithic application 116 and guest OS 120 to collect various information that is needed to perform the migration.

After collecting migration-related information through agents 118, migration controller 124 uses the information to generate container files that include instructions for building containers that execute one or more processes as microservices. In addition, migration controller 124 generates a container file that includes instructions for building a container that executes all other processes of monolithic application 116. To generate the container files, migration controller 124 populates container file templates from database 126. The resulting container files are then transmitted to cloud datacenter 150 to build containers.

Furthermore, in the case of well-known monolithic applications 116, there may be well-known processes for which various information is already compiled for generating a container file. For example, for a well-known process, a Docker® image may be readily available from a central Docker registry. Such a Docker image may include: (1) a binary for running the well-known process; (2) binaries for running child processes of the well-known process; (3) binaries for running processes with which the well-known process communicates; and (4) shared libraries upon which the processes depend. Such a Docker image may pulled from the central Docker registry and any additional required information such as environment variables may be added to generate a final Docker container file for a microservice.

Migration controller 124 also generates deployment files and optionally service files that include instructions for deploying the containers onto container platform 164. To generate deployment and service files, migration controller 124 populates deployment file and service file templates from database 126. In the embodiments, YAML files are generated for deployments and services, and Kubernetes master 168 configures the container platform 164 in accordance with the instructions specified in the YAML files.

It should be recognized that many of the processes executing within a monolithic application 116, especially processes executing within a non-privileged user space, may be able to run individually as microservices. These processes are deployed in container platform 164 to execute in separate containers. The remaining processes, especially those running within a privileged kernel space, are deployed in container platform 164 to execute within a single container. The containers for a monolithic application 116 may be deployed in a single pod or may even be deployed in separate pods on separate hosts 160 to balance loads between hosts 160. Furthermore, in the case of a monolithic application 116 that is distributed across multiple. VMs 114, the processes of a first VM 114 may be deployed in a first pod of container platform 164, while the processes of a second VM 114 may be deployed in a second pod.

Figure 2A:
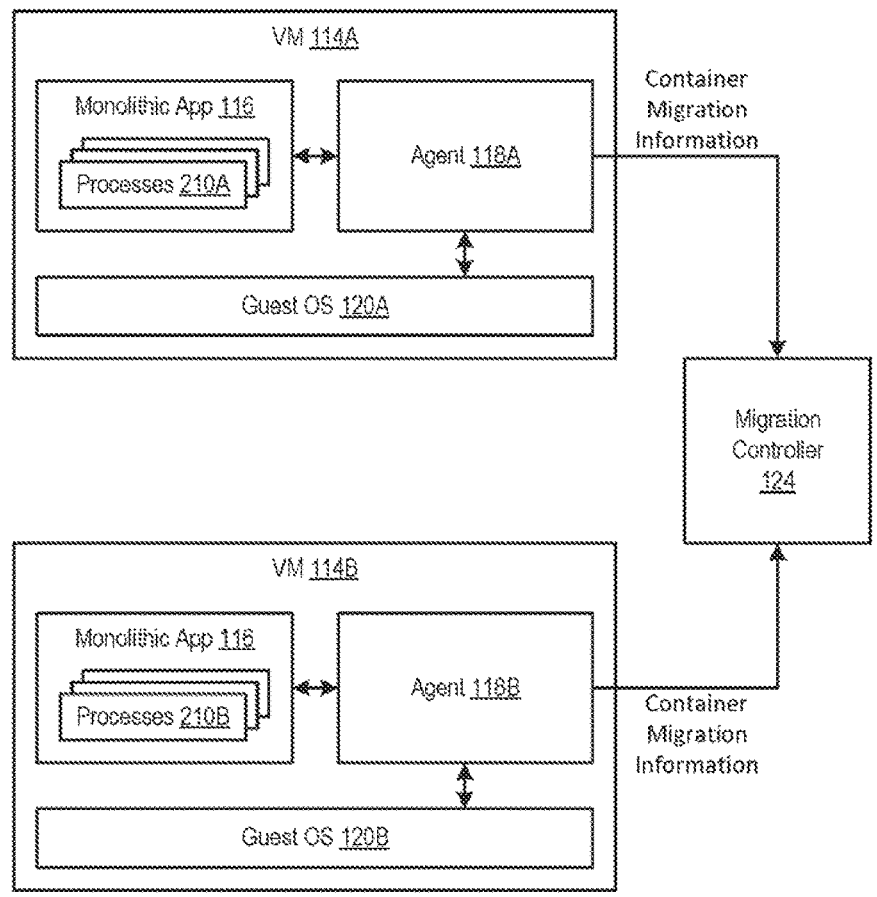
FIG. 2A is a block diagram illustrating a migration controller collecting information about a monolithic application, according to an embodiment.

FIG. 2A is a block diagram illustrating a migration controller 124 collecting information about a monolithic application 116, according to an embodiment. In the example of FIG. 2A, monolithic application 116 is distributed across two VMs 114A and 114B. Specifically, monolithic application 116 runs on a guest OS 120A in VM 114A and a guest OS 120B in VM 114B. At VM 114A, monolithic application 116 runs processes 210A, and at VM 114B, monolithic application 116 runs processes 210B.

To collect information about monolithic application 116, migration controller 124 installs a migration agent 118A in VM 114A and a migration agent 118B in VM 114B. Agents 118A and 118B collect migration-related information over a period of time, e.g., twenty-four hours. Agents 118A and 118B then transmit such information to migration controller 124. The collection of such information is described further below in conjunction with FIGS. 3A and 3B.

Figure 2B:
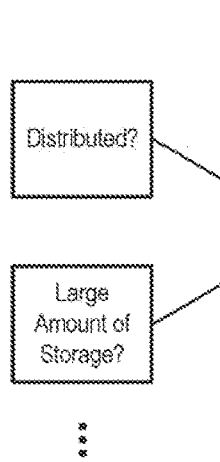
FIG. 2B is a block diagram illustrating a migration controller analyzing migration-related information, according to an embodiment.
Figure 2B:
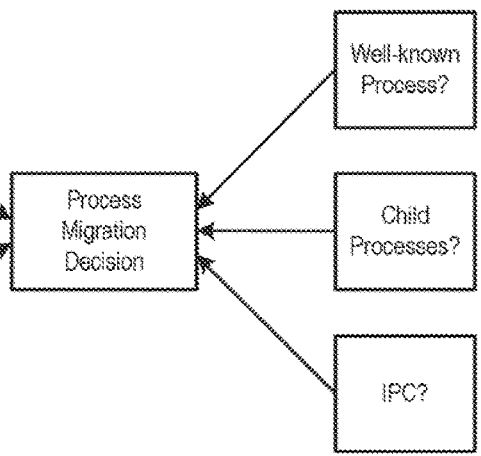

FIG. 2B is a block diagram illustrating a migration controller 124 analyzing migration-related information, according to an embodiment. Migration controller 124 analyzes monolithic applications 116 process-by-process to determine whether a process can be run as a microservice (either by itself or grouped with one or more other processes). In one embodiment, migration controller 124 determines a migration score that is displayed to an administrator, a high migration score being assigned to a process that is relatively easy to migrate as a microservice and a low migration score being assigned to a process that is relatively difficult to migrate as a microservice. The administrator may then manually make migration decisions as to which processes or groups of processes to migrate as microservices.

As shown in FIG. 2B, migration controller 124 considers various application-specific factors, such as whether the monolithic application 116 is distributed and whether it uses a large amount of storage space. For example, monolithic applications 116 that are distributed or that are large may be more difficult to split into and migrate as microservices. As such, a monolithic application 116 being distributed or large may reduce the likelihood of automatically migrating processes therein as microservices (or lower the migration scores of processes therein).

Additionally, for each process that migration controller 124 analyzes, various process-specific factors are considered. For example, if a particular process is well known such that various information is already compiled for generating a container file, such a process may be more likely to be automatically migrated as its own microservice (or the process being well known may raise its migration score). On the other hand, if a particular process has child processes or if the particular process communicates with any other processes, i.e., has inter-process communication (IPC), such a process may be less likely to be automatically migrated as its own microservice (or such factors may lower its migration score).

Some of the factors considered by migration controller 124 may make migrating a particular process more difficult, while others may make such a migration simpler. For example, processes 210A and 210B of FIG. 2A are part of a distributed monolithic application 116. However, if, for example, a particular process 210A does not have any child processes and does not communicate with any other processes, it may still be relatively easy to migrate the particular process 210A as a separate microservice. To handle competing factors, various approaches to making an automated migration decision or determining a migration score may be used. For example, the factors may be weighted, with certain factors such as a process being well known being given more weight than other factors. Furthermore, such weights may be gradually adjusted as migrations are performed and the relative importance of various factors become clearer for various monolithic applications 116.

Additionally, some application and process-specific factors may influence how processes may be migrated. For example, if a monolithic application 116 is distributed across multiple VMs 114, the processes of the monolithic application 116 may similarly be deployed as containers in multiple pods of container platform 164. In the example of FIG. 2A, processes 210A may be deployed as containers in a different pod than that of processes 210B. Furthermore, if a selected process has one or more child processes, the selected process and its child processes may be migrated together as a single microservice. Similarly, two processes may communicate by sharing memory, i.e., have IPC. Such processes may also be migrated together as a single microservice. The analysis of migration-related information is discussed further below in conjunction with FIG. 4.

Figure 2C:
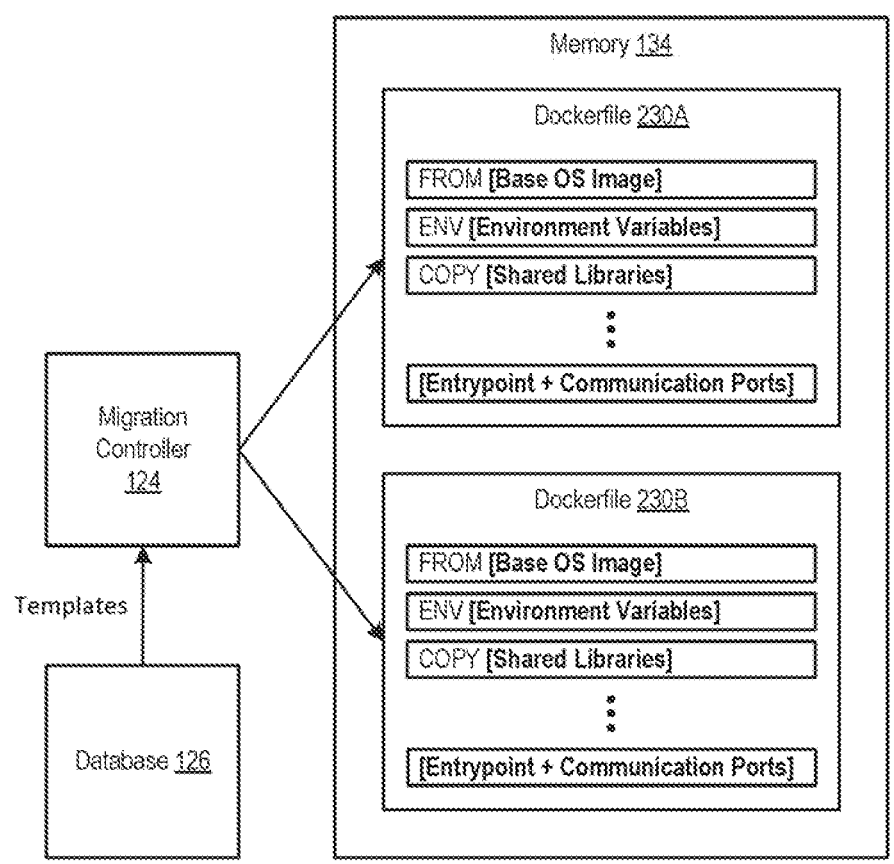
FIG. 2C is a block diagram illustrating a migration controller generating instructions for building containers to execute processes, according to an embodiment.

FIG. 2C is a block diagram illustrating a migration controller 124 generating container files that include instructions for building containers that execute processes of a monolithic application 116, according to an embodiment. FIG. 2C illustrates generating such container files for a microservice of each of VMs 114A and 114B of FIG. 2A. Furthermore, FIG. 2C involves generating container files for Docker containers, referred to as Dockerfiles. However, container files for other kinds of containers may be generated.

Migration controller 124 obtains container file templates from database 126, which are Dockerfile templates in FIG. 2C. In the example of FIG. 2C, the processes being migrated as microservices are not well known. As such, container files are generated with a base OS image, shared libraries, etc. After populating the templates, migration controller 124 stores the completed container files in memory 134 as Dockerfiles 230A and 230B. For clarity, information of Dockerfiles 230A and 230B that is filled in is bolded, the remainder being part of the templates stored in database 126.

To automatically generate Dockerfiles 230A and 230B, migration controller 124 first includes base OS images. Each base OS image may be that of a detected guest OS 120. Migration controller 124 also lists the names and values of any environment variables used by the processes being containerized and copies any shared libraries used by the processes. After adding any other information that will be used for generating containers, migration controller 124 specifies entrypoints to the code of monolithic application 116 for the processes, including exposing communication ports detected by agents 118A and 118B. The automatic generation of container files is discussed further below in conjunction with FIGS. 5A-5C.

Figure 2D:
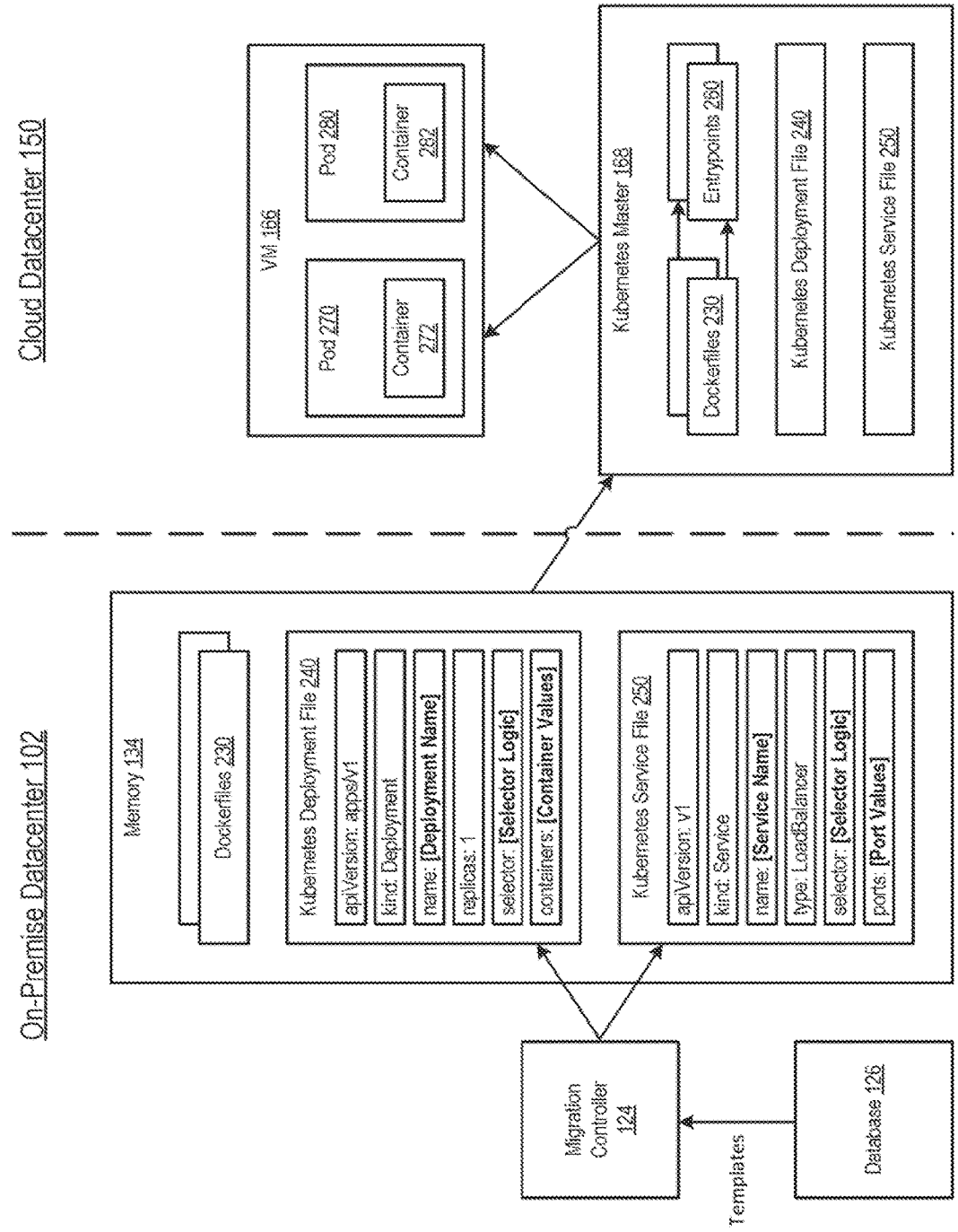
FIG. 2D is a block diagram illustrating the deployment of containers executing migrated processes, according to an embodiment.

FIG. 2D is a block diagram illustrating the deployment of containers executing migrated processes, according to an embodiment. Specifically, FIG. 2D illustrates deploying onto container platform 164 the microservices for which Dockerfiles 230A and 230B were generated in FIG. 2C.

In the example of FIG. 2D, both a deployment and a service are created for microservices being deployed. Migration controller 124 thus obtains deployment and service file templates from database 126. Migration controller 124 then populates these templates with specific information of monolithic application 116 and its processes that were collected by agents 118A and 118B. After populating the templates, migration controller 124 stores the completed files in memory 134 as deployment file 240 and service file 250. For clarity, information of files 240 and 250 that is filled in is bolded, the remainder being part of the templates stored in database 126.

Deployment file 240 is populated with an application programming interface (API) version "apps/v1". A "kind" field populated with the value "Deployment" is added to specify that this is a deployment file. A "name" field is added, which includes a deployment name that may be based on the names of the processes being deployed. A "replicas" field populated with the value "1" specifies that there is one replica of the deployment to maintain. A "selector" field is added, which defines how the deployment finds pods to manage such as by the labels for pods. Finally, a "containers" field is added, including names and images of containers to deploy. The names of containers may be based on the names of the processes being deployed, and the images of containers may be built using Dockerfiles 230A and 230B.

Service file 250 is also populated with an API version "v1". A "kind" field populated with the value "Service" is added to specify that this is a service file. A "name" field is added, which includes a service name that may be based on the names of the processes for which the service file is being created. A "type" field is added, which includes the type "LoadBalancer" for the service but may alternatively be a different type of service. A "selector" field is added, which defines how the service finds pods to transmit traffic to. Finally, a "ports" field is added, including port values such as a communication protocol, port numbers, and target port numbers detected by agents 118A and 118B.

Dockerfiles 230A and 230B, deployment file 240, and service file 250 are transmitted to Kubernetes master 168. As shown in FIG. 2D, Dockerfiles 230A and 230B point to entrypoints 260 to the code of monolithic application 116. Kubernetes master 168 deploys the containers built using Dockerfiles 230A and 230B to container platform 164 in accordance with contents of deployment file 240 and service file 250. A container 272 is deployed in a pod 270, and a container 282 is deployed in a pod 280. The migration of processes of monolithic application 116 to container platform 164 is discussed further below in conjunction with FIGS. 6A-6D.

Figure 3A:
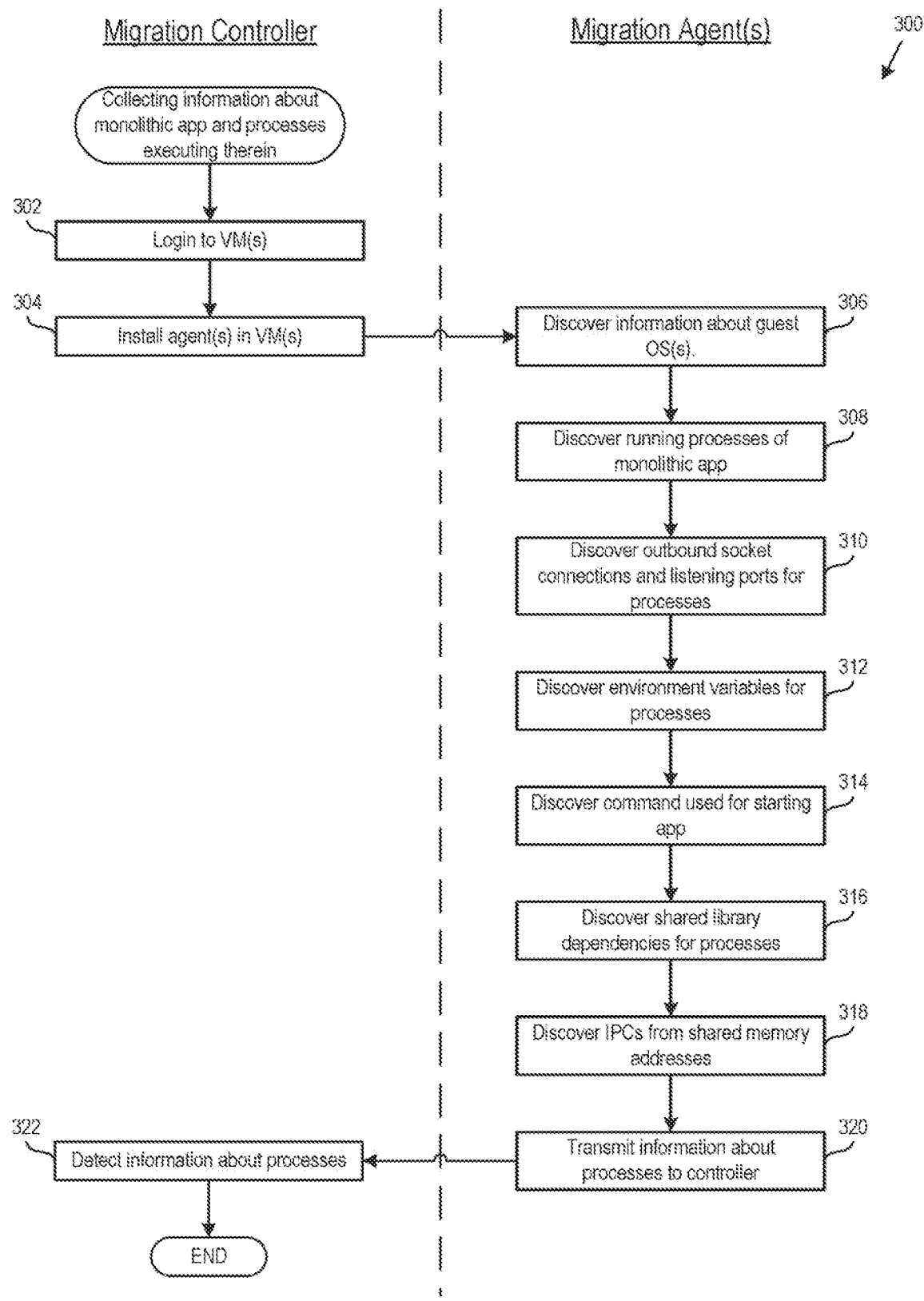
FIG. 3A is a flow diagram of steps carried out by a migration controller and one or more migration agents to carry out a method of collecting information about a monolithic application, according to an embodiment.

FIG. 3A is a flow diagram of steps carried out by a migration controller 124 and one or more migration agents 118 to carry out a method 300 of collecting information about a monolithic application 116, according to an embodiment. FIG. 3B is an example of such information. FIGS. 3A and 3B will be discussed together.

At step 302 of method 300, migration controller 124 logs in to a VM 114 (or multiple VMs 114 in the case of a distributed monolithic application 116), e.g., by entering access credentials. At step 304, migration controller 124 installs an agent 118 in each VM 114 to monitor the monolithic application 116 and each guest OS 120. Agents 118 may monitor over a period of time, e.g., for twenty-four hours.

Steps 306-318 of method 300 provide examples of discovering information that may be used to carry out the present invention. However, such examples are intended to be illustrative and not exhaustive of the information that may be collected. Furthermore, such steps will be discussed with examples in which each guest OS 120 is a Linux distribution. However, a person having ordinary skill in the art would recognize that method 300 may be performed with a different guest OS 120.

At step 306, each installed agent 118 discovers information about a guest OS 120. For example, the Linux command "uname-a" may be used to discover such information. Lines 330 of FIG. 3B show an example of such information about a guest OS 120. In the example of lines 330, a guest OS 120 is release 20.04 of Ubuntu®.

At step 308 of method 300, each installed agent 118 discovers the running processes of monolithic application 116. For example, the Linux command "ps-aux" may be used to discover such information. Lines 332 of FIG. 3B show an example of such information. In the example of lines 332, there are four running processes within a monolithic application 116 with process IDs of "1473", "1533", "1534", and "1608". Furthermore, the processes with process IDs of "1533" and "1534" are children of the process with the process ID "1473".

At step 310 of method 300, each installed agent 118 discovers outbound socket connections and listening ports for processes. For example, a utility such as netstat may be used to discover such information. In the example of lines 334 of FIG. 3B, the process with the process ID "1608" includes two outbound socket connections using TCP. Such outbound socket connections use local ports "63085" and "63681" of local IP address "127.0.0.1". The process further includes a listening port "9003" using TCP version 6.

At step 312 of method 300, each installed agent 118 discovers environment variables of processes. For example, the Linux command "P.environ( )", where the variable "P" stores a process ID, may be used to discover such information for a particular process. Lines 336 of FIG. 3B show an example of the environment variables for a process. Such environment variables include "INSTALL_BIN_PATH", "PWD", "LANG", "AVI_METRICS_TIMER", "PATH", and "LOG_DIR".

At step 314 of method 300, each installed agent 118 discovers commands for starting processes, including arguments to pass to the processes. For example, the Linux command "P.cmdline( )", where the variable "P" again stores a process ID, may be used to discover the command for a particular process. Lines 338 of FIG. 3B show an example of such a command along with arguments.

At step 316 of method 300, each installed agent 118 discovers shared library dependencies of processes. For example, the Linux command "awk '$NF!~/\.so/{next} {$0=$NF} !a[$0]++'/proc/1608/maps" may be used to discover such library dependencies of the process with the process ID "1608". Lines 340 of FIG. 3B show three of such library dependencies.

At step 318 of method 300, each installed agent 118 discovers IPCs of processes. For example, the Linux commands "shm attach process list, group by shm key" and "process shm usage" may be used to discover such IPCs through shared memory 134 addresses. Lines 342 of FIG. 3B show an example in which there are IPCs between two processes "se_agent" and "se_dp".

At step 320 of method 300, each installed agent 118 transmits collected information about the processes to migration controller 124. At step 322, migration controller 124 detects the transmitted information about the processes, and method 300 ends.

Figure 4:
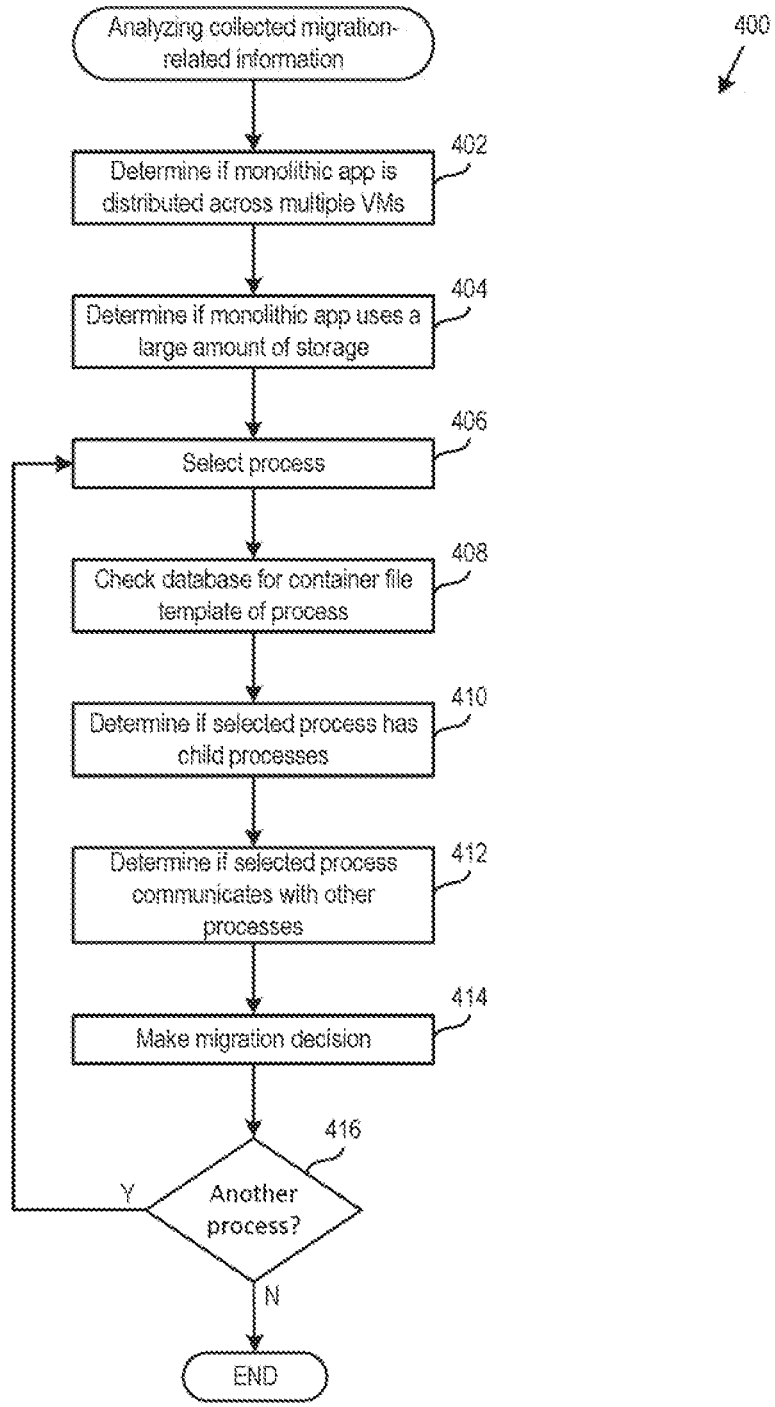
FIG. 4 is a flow diagram of steps carried out by a migration controller to carry out a method of analyzing migration-related information, according to an embodiment.

FIG. 4 is a flow diagram of steps carried out by a migration controller 124 to carry out a method 400 of analyzing migration-related information, according to an embodiment. Migration controller 124 may use information collected according to method 300 of FIG. 3A to perform such analysis. Steps of method 400 provide examples of factors that may impact a decision to automatically migrate processes as microservices or factors for determining a migration score to display to an administrator. However, such examples are intended to be illustrative and not exhaustive.

At step 402, migration controller 124 determines if a monolithic application 116 is distributed across multiple VMs 114. At step 404, migration controller 124 determines if the monolithic application 116 consumes a large amount of storage 136. For example, a monolithic application 116 being distributed or large may reduce the likelihood of automatically migrating processes therein as microservices (or lower the migration scores of processes therein).

At step 406, migration controller 124 selects a process of monolithic application 116 to analyze individually. At step 408, migration controller 124 checks database 126 for a container file template, e.g., a Dockerfile template, specific to the selected process, which database 126 may contain for a well-known process. For example, if a container file template for the selected process exists in database 126, the selected process may be more likely to be automatically migrated as its own microservice (or the existence of the template may raise its migration score).

At step 410, migration controller 124 determines if the selected process has any child processes. If the selected process has any child processes, the selected process may be migrated along with its child processes (if migrated as a microservice). At step 412, migration controller 124 determines if the selected process has any IPC. If the selected process has any IPC, the selected process may be migrated along with any other processes with which the selected process communicates (if migrated as a microservice). If the selected process has child processes or IPC, the selected process may be less likely to be automatically migrated as its own microservice (or such factors may lower its migration score).

At step 414, migration controller 124 makes a migration decision of whether to migrate the selected process as a microservice. Migration controller 124 may make the decision automatically based on, e.g., the above-mentioned factors. Alternatively, migration controller 124 may generate a migration score based on the above-mentioned factors and display the score to an administrator who makes the decision. Either way, as mentioned previously, competing factors may be considered based on a predetermined weighting.

At step 416, migration controller 124 checks if there is another process to analyze. If there is another process, method 400 returns to step 406, and migration controller 124 selects another process. If there is not another process to analyze, method 400 ends.

Figure 5A:
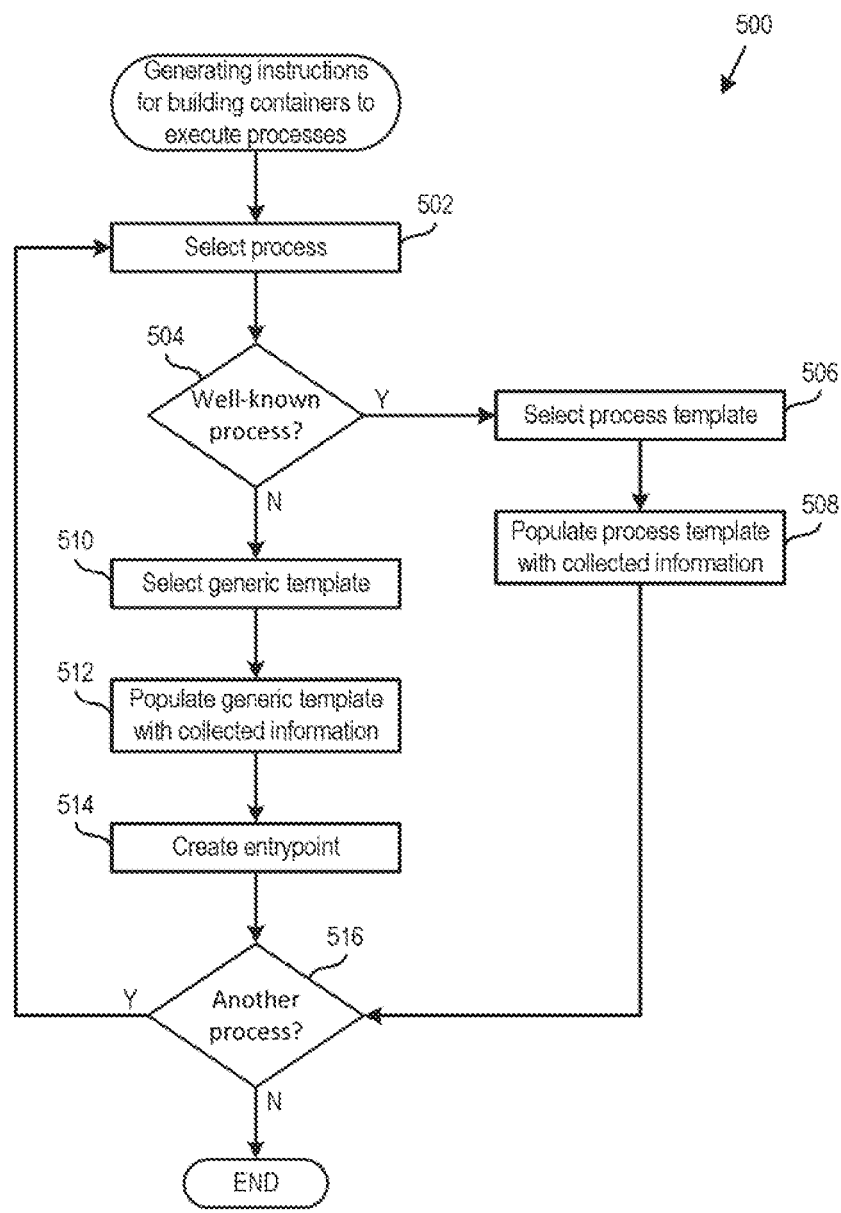
FIG. 5A is a flow diagram of steps carried out by a migration controller to carry out a method of generating instructions for building containers to execute processes, according to an embodiment.

FIG. 5A is a flow diagram of steps carried out by a migration controller 124 to carry out a method 500 of generating instructions for building containers to execute processes, according to an embodiment. At step 502, migration controller 124 selects a process. At step 504, if the process is well known, method 500 moves to step 506, and migration controller 124 selects a container file template specific to the well-known process from database 126. For example, in the case of building a Docker container, the container file template is a Dockerfile template that pulls a Docker image from the central Docker registry. At step 508, migration controller 124 populates the selected container file template with information collected according to method 300 of FIG. 3A such as environment variables used by the well-known process, by its child processes, and by processes with which the well-known process communicates.

At step 504, if the selected process is not well known, method 500 moves to step 510, and migration controller 124 selects a generic template from database 126 such as a generic Dockerfile template. At step 512, migration controller 124 populates the generic template based on information collected according to method 300 of FIG. 3A such as shared libraries and environment variables. At step 514, migration controller 124 creates an entrypoint to the code of monolithic application 116.

At step 516, migration controller 124 checks if there is another process to generate instructions for. If there is another process, method 500 returns to step 502, and migration controller 124 selects another process. If there is not another process, method 500 ends.

FIG. 5B is an example of an automatically generated Dockerfile 520 for building a container to execute processes of a microservice, according to an embodiment. Dockerfile 520 is created for a process that is not well known. For clarity, information of Dockerfile 520 that is filled in is bolded.

Dockerfile 520 first fetches the base OS image of a container, which is an image of release 20.04 of Ubuntu. Dockerfile 520 then includes a maintainer label specifying the generator of Dockerfile 520, which is "vShift@test.com", i.e., migration controller 124. Dockerfile 520 then specifies all the environment variables and shared libraries used by the microservice of Dockerfile 520 such that the environment variables and libraries remain accessible after migration. Finally, Dockerfile 520 exposes a port 9003 as a TCP listening port and creates an entrypoint file called "entrypoint.sh" to start the processes of the microservice in a container. It should be noted that for a well-known process, instead of fetching a base OS image, an image may be pulled that already contains various information such as shared libraries and binaries for starting processes.

FIG. 5C is an example of an automatically generated entrypoint file 530 for starting migrated processes of a microservice, according to an embodiment. Entrypoint file 530, which is called "entrypoint.sh", starts two processes: an "se_agent" process and an "se_dp" process. Entrypoint file 530 may call multiple processes, e.g., because such processes communicate with each other and thus are migrated together as a single microservice to maintain such communication.

Figure 6A:
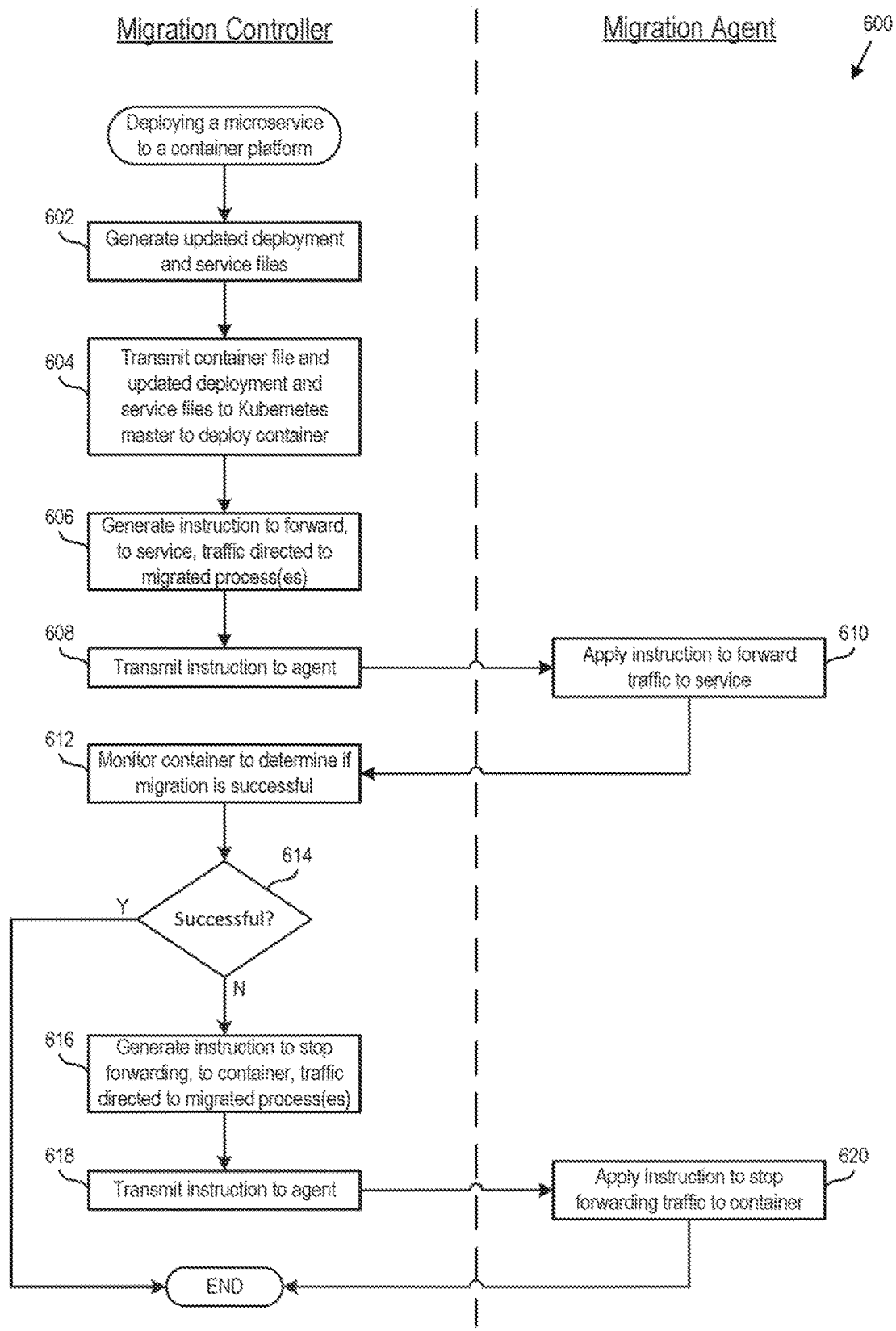
FIG. 6A is a flow diagram of steps carried out by a migration controller and a migration agent to carry out a method of deploying a container executing one or more migrated processes, according to an embodiment.

FIG. 6A is a flow diagram of steps carried out by a migration controller 124 and a migration agent 118 to carry out a method 600 of deploying a container executing one or more migrated processes, according to an embodiment. Method 600 may be used either to migrate one or more processes of a microservice or to migrate the remaining processes of a monolithic application 116 that are not migrated as microservices. FIG. 6B is an example of an automatically generated deployment file. FIG. 6C is an example of an automatically generated service file. FIG. 6D is an example of automatically generated firewall rules. FIGS. 6A-6D will be discussed together.

At step 602 of method 600, migration controller 124 automatically generates updated deployment and service files, e.g., deployment file 630 of FIG. 6B and service file 640 of FIG. 6C. The updated deployment and service files incorporate the process(es) currently being migrated and all the previous processes that have already been migrated. For clarity, information of files 630 and 640 that is filled in is bolded.

Deployment file 630 uses API version "apps/v1", names a deployment "se-agent-se-dp-deployment", and labels the deployment "se-agent-se-dp". The names and labels are based on the names of two processes of a microservice that are migrated: an "se-agent" process and an "se-dp" process. Deployment file 630 further specifies one replica to maintain and selects pods that match the label "se-agent-se-dp". Deployment file 630 further names a container "se-agent-se-dp-container" and selects an image "se-agent-se-dp-image" to deploy. The name of the container is based on the names of the two processes that are migrated, and the image is generated by running Dockerfile 520 of FIG. 5B.

Service file 640 of FIG. 6C also uses API version "v1" and names a service "se-agent-se-dp-service" based on the names of the processes. Service file 640 further specifies that the service is a "LoadBalancer", selects the application "se-agent-se-dp", and specifies port 9003 for communicating with a microservice through TCP.

At step 604, migration controller 124 transmits, to Kubernetes master 168, a container file and updated deployment and service files, e.g., Dockerfile 520 of FIG. 5B and deployment and service files 630 and 640 of FIGS. 6B and 6C, respectively. Kubernetes master 168 then runs the transmitted files to update the deployment and service of the processes on container platform 164.

Steps 606-610 apply to migrated process(es) that listen on a particular port and for which traffic will be forwarded from monolithic application 116 to container platform 164. At step 606, migration controller 124 generates an instruction to forward, to the service, traffic intended for the migrated process(es). For example, migration controller 124 may automatically generate the firewall rules of FIG. 6D based on information collected according to method 300 of FIG. 3A. The firewall rules of FIG. 6D are iptables rules that forward traffic to a port 9003. At step 608, migration controller 124 transmits the instruction generated at step 606 to agent 118. At step 610, agent 118 applies the instruction, e.g., by instructing a guest OS 120 to add the firewall rules of FIG. 6D. After step 610, the migration of the current process(es) is complete, and any traffic bound for the migrated process(es) should be forwarded from monolithic application 116 to the service, the service providing the traffic to the deployed container.

At step 612, migration controller 124 monitors the deployed container, e.g., for a predetermined amount of time, to determine if the container executes as expected, i.e., that the migration of the process(es) was successful. For example, migration controller 124 may check a status of a pod in which the container was deployed to determine if any error codes have been outputted by the container due to the process(es) therein crashing. Such error codes are transmitted from cloud datacenter 150 back to migration controller 124 in on-premise datacenter 102. Furthermore, migration controller 124 may attempt to ping any listening ports of the processes to make sure such listening ports are reachable. At step 614, if the migration was successful, method 600 ends, and the container continues executing the migrated process(es). Otherwise, if the migration was unsuccessful, method 600 moves to step 616.

Steps 616-620 apply to migrated process(es) that listen on a particular port. At step 616, migration controller 124 generates an instruction to stop forwarding, to the deployed container, traffic intended for the process(es). For example, migration controller 124 may generate an instruction to delete the firewall rules of FIG. 6D. At step 618, migration controller 124 transmits the instruction generated at step 616 to agent 118. At step 620, agent 118 applies the instruction, e.g., by instructing guest OS 120 to delete the firewall rules of FIG. 6D. After step 620, method 600 ends. If the migration was unsuccessful, the process(es) may execute from monolithic application 116. Method 600 thus allows for an unsuccessful migration to be reversed.

Method 600 may be performed to deploy containers for each of the processes of a monolithic application 116. Furthermore, after all the processes of the monolithic application 116 have been migrated successfully, any traffic intended for the processes may be directly sent to the service of the deployed containers. In other words, traffic no longer needs to be sent to monolithic application 116 and forwarded to container platform 164. As such, an IP address of the service is transmitted to the external sources of such traffic for further communications.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of migrating a monolithic application to a container platform to execute as a plurality of microservices, said method comprising:
   installing a first agent that collects information about the monolithic application;
   upon receiving the information collected by the first agent, determining from the received information collected by the first agent: (1) that there exists an inter-process communication between a first process of the monolithic application and a second process of the monolithic application, and (2) that the first process listens on a port;
   based on the existence of the inter-process communication, determining to execute the first and second processes together as a first microservice;
   generating a first container file including instructions for building a first container (1) that executes the first and second processes together as the first microservice and (2) that is configured to listen on the port;
   generating a deployment file for deploying the first container, wherein the first container is then deployed on the container platform based on the generated deployment file;
   based on the first process listening on the port, instructing the first agent to forward to the first container, traffic that is directed to the first process;
   after instructing the first agent to forward the traffic to the first container, determining an error in the execution of the first container; and
   in response to determining the error, instructing the first agent to stop forwarding the traffic to the first container.

2. The method of claim 1, wherein instructing the first agent to forward the traffic to the first container comprises instructing the first agent to add a firewall rule, and instructing the first agent to stop forwarding the traffic to the first container comprises instructing the first agent to delete the added firewall rule.

3. The method of claim 1, wherein the monolith c application executes in a first virtual machine (VM), and wherein the first agent is installed in the first VM.

4. The method of claim 3, wherein the monolithic application also executes in a second VM, said method further comprising:
   installing, in the second VM, a second agent that collects information about the monolithic application;
   upon receiving the information collected by the second agent, wherein the received information collected by the second agent includes information about a third process of the monolithic application, determining to execute the third process as a second microservice in a different pod than a pod of the first microservice; and
   generating a second container file including instructions for building a second container that executes the third process as the second microservice, wherein the second container is then deployed on the container platform based on the generated deployment file, the first container being deployed to a first pod, and the second container being deployed to a second pod.

5. The method of claim 1, further comprising:
based on the received information collected by the first agent, determining a migration score that indicates how easily the first and second processes can be migrated to the container platform as the first microservice.

6. A non-transitory computer readable medium comprising instructions that are executable in a computer system, wherein the instructions when executed cause the computer system to carry out a method of migrating a monolithic application to a container platform to execute as a plurality of microservices, and wherein said method comprises:
installing a first agent that collects information about the monolithic application;
upon receiving the information collected by the first agent, determining from the received information collected by the first agent: (1) that there exists an inter-process communication between a first process of the monolithic application and a second process of the monolithic application, and (2) that the first process listens on a port;
based on the existence of the inter-process communication, determining to execute the first and second processes together as a first microservice;
generating a first container file including instructions for building a first container (1) that executes the first and second processes together as the first microservice and (2) that is configured to listen on the port;
generating a deployment file for deploying the first container, wherein the first container is then deployed on the container platform based on the generated deployment file;
based on the first process listening on the port, instructing the first agent to forward to the first container, traffic that is directed to the first process;
after instructing the first agent to forward the traffic to the first container, determining an error in the execution of the first container; and
in response to determining the error, instructing the first agent to stop forwarding the traffic to the first container.

7. The non-transitory computer readable medium of claim 6, wherein instructing the first agent to forward the traffic to the first container comprises instructing the first agent to add a firewall rule, and instructing the first agent to stop forwarding the traffic to the first container comprises instructing the first agent to delete the added firewall rule.

8. The non-transitory computer readable medium of claim 6, wherein the monolithic application executes in a first virtual machine (VM), and wherein the first agent is installed in the first VM.

9. The non-transitory computer readable medium of claim 8, wherein the monolithic application also executes in a second VM, and wherein said method further comprises:
installing, in the second VM, a second agent that collects information about the monolithic application;
upon receiving the information collected by the second agent, wherein the received information collected by the second agent includes information about a third process of the monolithic application, determining to execute the third process as a second microservice in a different pod than a pod of the first microservice; and
generating a second container file including instructions for building a second container that executes the third process as the second microservice, wherein the second container is then deployed on the container platform based on the generated deployment file, the first container being deployed to a first pod, and the second container being deployed to a second pod.

10. The non-transitory computer readable medium of claim 6, wherein said method further comprises:
based on the received information collected by the first agent, determining a migration score that indicates how easily the first and second processes can be migrated to the container platform as the first microservice.

11. A computer system comprising:
a first host and a second host, and
a controller configured to:
install a first agent on the first host that collects information about a monolithic application executing on the first host;
upon receiving the information collected by the first agent, determine from the received information collected by the first agent: (1) that there exists an inter-process communication between a first process of the monolithic application and a second process of the monolithic application, and (2) that the first process listens on a port,
based on the existence of the inter-process communication, determine to execute the first and second processes together as a first microservice;
generate a first container file including instructions for building a first container (1) that executes the first and second processes together as the first microservice and (2) that is configured to listen on the port;
generate a deployment file for deploying the first container, wherein the first container is then deployed on a container platform of the second host based on the generated deployment file;
based on the first process listening on the port, instruct the first agent to forward to the first container, traffic that is directed to the first process;
after instructing the first agent to forward the traffic to the first container, determine an error in the execution of the first container; and
in response to determining the error, instruct the first agent to stop forwarding the traffic to the first container.

12. The computer system of claim 11, wherein instructing the first agent to forward the traffic to the first container comprises instructing the first agent to add a firewall rule, and instructing the first agent to stop forwarding the traffic to the first container comprises instructing the first agent to delete the added firewall rule.

13. The computer system of claim 11, wherein the monolithic application executes in a first virtual machine (VM) of the first host, and wherein the first agent is installed in the first VM.

14. The computer system of claim 13, wherein the monolithic application also executes in a second VM of the first host, and the controller is further configured to:
install, in the second VM, a second agent that collects information about the monolithic application;
upon receiving the information collected by the second agent, wherein the received information collected by the second agent includes information about a third process of the monolithic application, determine to execute the third process as a second microservice in a different pod than a pod of the first microservice; and
generate a second container file including instructions for building a second container that executes the third process as the second microservice, wherein the second container is then deployed on the container platform based on the generated deployment file, the first container being deployed to a first pod, and the second container being deployed to a second pod.

15. The computer system of claim 11, wherein the controller is further configured to:
based on the received information collected by the first agent, determine a migration score that indicates how easily the first and second processes can be migrated to the container platform as the first microservice.

* * * * *